United States Patent
Appleton

(10) Patent No.: US 10,569,776 B2
(45) Date of Patent: Feb. 25, 2020

(54) HYDRAULIC CONTROL SYSTEM

(71) Applicant: Deere & Company, Moline, IL (US)

(72) Inventor: Andy B. Appleton, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 60 days.

(21) Appl. No.: 15/830,918

(22) Filed: Dec. 4, 2017

(65) Prior Publication Data
US 2019/0168759 A1 Jun. 6, 2019

(51) Int. Cl.
*B60W 10/10* (2012.01)
*B60W 30/18* (2012.01)
*F16H 61/02* (2006.01)
*B60W 10/06* (2006.01)

(52) U.S. Cl.
CPC ............ *B60W 30/18* (2013.01); *B60W 10/06* (2013.01); *B60W 10/10* (2013.01); *F16H 61/0213* (2013.01); *B60W 2510/30* (2013.01); *B60W 2710/1005* (2013.01); *Y10T 477/631* (2015.01); *Y10T 477/636* (2015.01)

(58) Field of Classification Search
CPC .................. Y10T 477/631; Y10T 477/636; B60W 30/18; B60W 10/10; B60W 2510/30; B60W 2710/1005; F16H 61/0213

USPC .................................. 475/72, 73, 74, 76, 83
See application file for complete search history.

(56) References Cited

U.S. PATENT DOCUMENTS

| | | | | |
|---|---|---|---|---|
| 4,766,779 | A * | 8/1988 | Massy | F16H 47/02 475/83 |
| 6,106,427 | A * | 8/2000 | Nikolaus | F16H 47/04 475/72 |
| 6,272,950 | B1 * | 8/2001 | Braun | F16H 47/02 74/731.1 |
| 6,435,999 | B1 * | 8/2002 | Nanri | F16H 61/425 475/76 |
| 8,640,451 | B2 * | 2/2014 | Akiyama | E02F 9/20 60/431 |
| 8,657,713 | B2 * | 2/2014 | Hana | F16H 47/04 180/53.4 |
| 9,975,424 | B2 * | 5/2018 | Krapf | B60K 17/28 |
| 2001/0007212 | A1 * | 7/2001 | Nemoto | F16H 47/02 74/731.1 |
| 2014/0128196 | A1 * | 5/2014 | Rintoo | F16H 47/04 475/204 |

* cited by examiner

*Primary Examiner* — Roger L Pang
(74) *Attorney, Agent, or Firm* — Michael Best & Friedrich LLP

(57) ABSTRACT

A tractor includes an engine, a transmission coupled to the engine, a hydraulic pump driven by the engine, at least one of a tractor implement, attachment, or control moved by the hydraulic pump, a sensor, and a controller coupled to the transmission. The controller is configured to downshift the transmission based on a signal from the sensor.

14 Claims, 3 Drawing Sheets

HYDRAULIC CONTROL SYSTEM

BACKGROUND

The present disclosure relates to a hydraulic control system for a vehicle, in particular for a tractor.

Tractors often include hydraulic control systems that utilize a hydraulic pump to generate a flow of hydraulic fluid for control and to operate tractor implements (e.g., front shovel, rear shovel, mowing blades, planter, etc.). The hydraulic pump is driven by an engine of the tractor.

When a load from a tractor implement is not taxing the engine, the tractor typically benefits from a shift-up, throttle-back (SUTB) condition. With a higher gear ratio of the transmission, lower engine speed can achieve a required ground speed. Slower gears, shafts and other rotating components generally provide improved fluid economy. The SUTB condition may be adequate for the tractor when the tractor is planting or carrying out another operation as it traverses across a field. The hydraulic flow needs of the pump are met by the lower engine speed and are dictated by power requirements and available pump displacement. At the end of a field row or other condition requiring additional hydraulic fluid flow, however (e.g., when a planter needs to be hydraulically raised or when a tractor implement otherwise begins to tax the engine), the SUTB condition may not provide enough pump speed at a maximum displacement to meet hydraulic needs. Current systems do not change the gear ratios of the transmission in this situation. In particular, the controls of current systems do not recognize unmet hydraulic flow needs and the available pump displacement that could satisfy those needs.

SUMMARY

In another aspect, the disclosure provides a tractor having an engine, a transmission coupled to the engine, a hydraulic pump driven by the engine, at least one tractor implement, attachment, or control moved by the hydraulic pump, a sensor, and a controller coupled to the transmission. The controller is configured to downshift the transmission based on a signal from the sensor.

In one aspect, the disclosure provides a swashplate pump assembly having a swashplate pump with a pump housing and a swashplate disposed within the pump housing. The swashplate pump assembly also includes a sensor configured to detect an angle of the swashplate.

In another aspect, the disclosure provides a control system for adjusting a transmission on a tractor. The control system includes a memory and a processor. The processor is configured to receive a first signal from a sensor and to determine whether a hydraulic pump is approaching a maximum pump displacement based on current engine speed from the first signal. The processor is further configured to send a second signal to a transmission to cause the transmission to downshift and the engine to speed up if the processor determines that the hydraulic pump is approaching the maximum pump displacement.

Other aspects of the disclosure will become apparent by consideration of the detailed description and accompanying drawings.

DETAILED DESCRIPTION

Before constructions of the disclosure are explained in detail, it is to be understood that the disclosure is not limited in its application to the details of construction and the arrangement of components set forth in the following description or illustrated in the accompanying drawings. The disclosure is capable of supporting other constructions and of being practiced or of being carried out in various ways.

Figure 1:
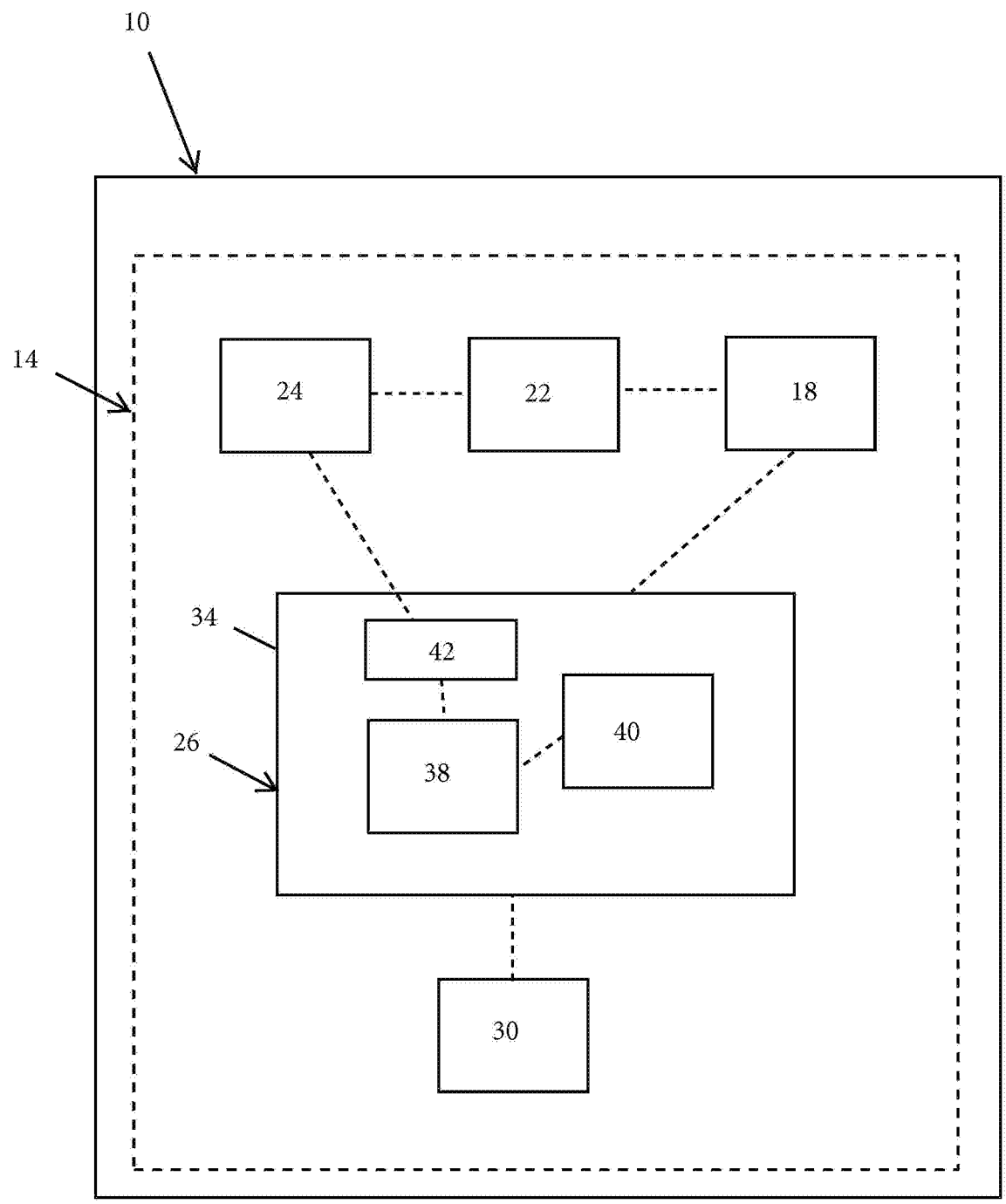
FIG. 1 is a schematic illustration of a hydraulic control system.

FIG. 1 schematically illustrates a tractor 10 and a hydraulic control system 14 disposed therein. While the hydraulic control system 14 is described in the context of the tractor 10, the hydraulic control system 14 may be utilized with any other motorized vehicle, including but not limited to agricultural or industrial vehicles, or with any machines with fluid flow needs, variable displacement hydraulics, and power management automation.

As illustrated in FIG. 1, the hydraulic control system 14 includes an engine 18. The engine 18 is a diesel engine, although in other constructions the engine 18 may be an internal combustion engine, electric motor, etc. The engine 18 is coupled to a transmission 22. The transmission 22 is an automatic transmission controlled by a controller 24 (which may include a memory and a processor for receiving and sending signals and performing calculations), although in other constructions the transmission 22 is a manual transmission.

Figure 2:
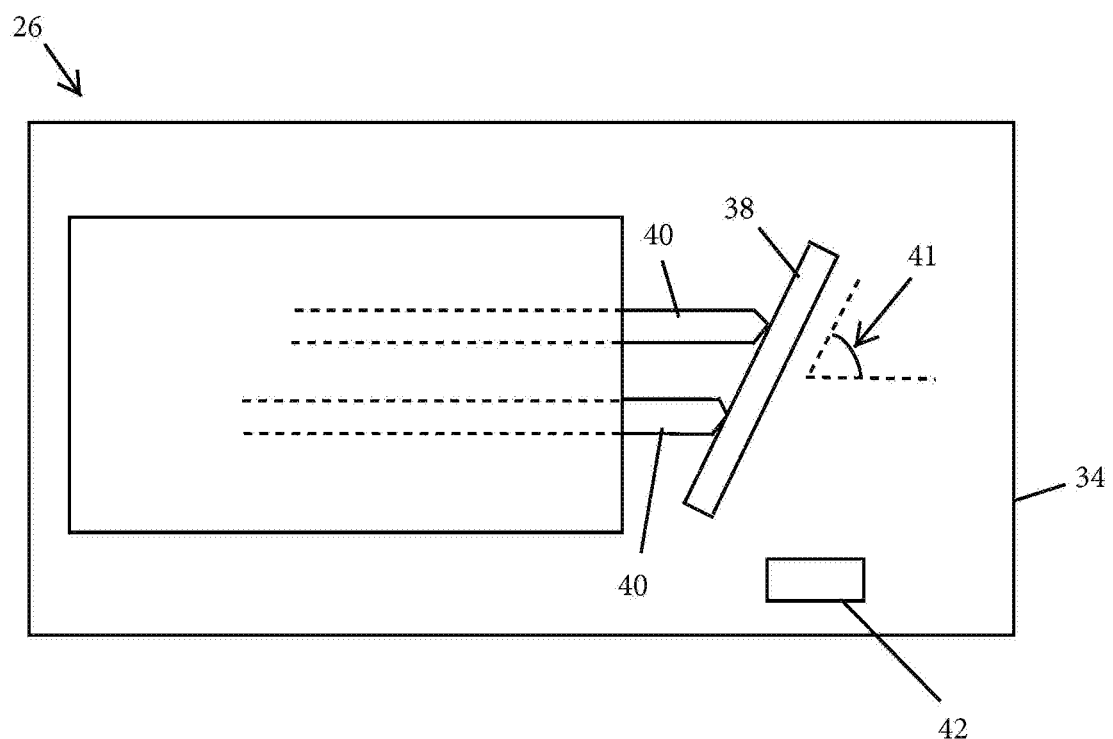
FIG. 2 is a schematic illustration of a hydraulic pump of the control system.

With reference to FIGS. 1 and 2, the hydraulic control system 14 further includes a hydraulic pump 26 coupled to and driven by the engine 18. The hydraulic pump 26 is a variable displacement pump that supplies hydraulic fluid to power and move one or more tractor implements, attachments, or controls 30 (e.g., on-board control such as steering, a planter, front shovel, rear shovel, mowing blades, etc.).

In the illustrated construction the hydraulic pump 26 includes a pump housing 34, a swashplate 38 disposed inside of the pump housing 34, and piston cylinders 40 disposed inside of the pump housing 30 that are pressed (e.g., via a spring or other biasing element) against the swashplate 38. The housing 34, swashplate 38, and piston cylinders 40 may be conventional. The available pump displacement of the hydraulic pump 26 is determined based on an angle 41 of the swashplate 38 within the pump housing 34. For example, the angle of the swashplate 38 is variably adjustable to any angle between two fixed angles, a first fixed angle corresponding to a minimum pump displacement, and a second fixed angle corresponding to a maximum pump displacement (each of the first and second angles being measured for example relative to an axis of the housing or any other reference line or plane as is understood in the field of swashplate pumps). In some constructions the angle of the swashplate 38 may be adjusted manually or automatically via a lever, hydraulic cylinder, spring, or other structure.

With reference to FIG. 1, the hydraulic control system 14 further includes a sensor 42 to detect an angle of the swashplate 38. In the illustrated construction the sensor 42 is a Hall Effect swivel angle sensor, although other constructions may include various other types of sensors 42 (e.g., rotary potentiometers, etc.), any of which may be used to detect an angle of the swashplate 38 within the pump housing 34. In the illustrated construction the sensor 42 is disposed within the pump housing 34. In other constructions the sensor 42 is spaced from the pump housing 34, and the pump housing 34 includes an opening or openings through which the sensor 42 may view or otherwise detect the angle of the swashplate 38. In some constructions multiple sensors 42 are used to detect the angle of the swashplate 38, As illustrated in FIG. 1, the sensor 42 (or sensors 42) is in communication with (e.g., wirelessly) the controller 24.

Figure 3:
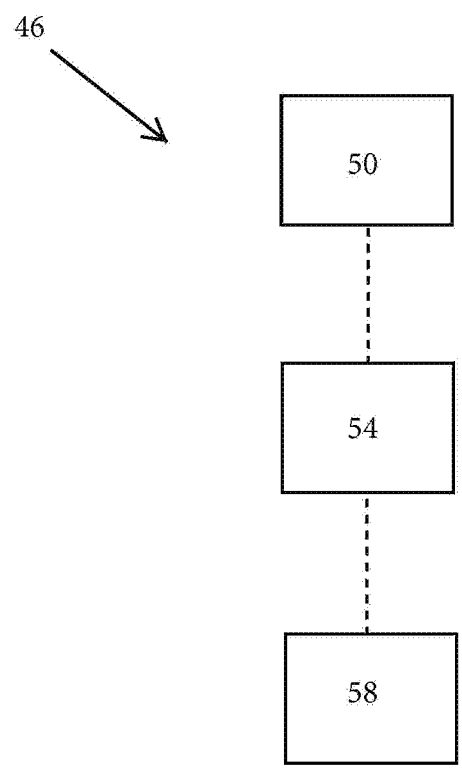
FIG. 3 is a flowchart illustrating use of the hydraulic control system.

FIG. 3 illustrates a control process 46 for operating the hydraulic control system 14. At block 50 of the control process 46, the sensor 42 initially monitors the angle of the swashplate 38, and sends a signal to the controller 24. In some constructions the sensor 42 is programmed or otherwise directed to continuously monitor the angle and provide signals. In other constructions the sensor 42 intermittently monitors the angle of the swashplate 38, or monitors the angle only upon a command from an operator.

At block 54 of the control process 46, the controller 24 receives a signal from the sensor 42 and determines an angle of the swashplate 38. If the controller 24 determines that the angle of the swashplate 38 is increasing and has reached a predetermined percentage (e.g., 85%, 90%, 95%, etc.) of its second fixed angle, or has reached a predetermined angle close to that of the second fixed angle (i.e., indicating that the pump 26 is approaching its maximum pump displacement based on current engine speed), the controller 24 sends a signal to the transmission 22 and engine 18 to automatically downshift the engine 18 and increase engine speed (assuming increased engine speed is available).

In some constructions, the controller 24 utilizes the following logic/code, where "maximum hydraulic pump displacement" corresponds to the predetermined percentage or predetermined angle referenced above:

> If current hydraulic pump displacement=maximum hydraulic pump displacement and (engine speed<(rated engine speed or operator set maximum engine speed)), then
>
> Downshift
> Increase engine speed
> Set state to pump flow control drive strategy=true Downshifting and increasing the engine speed increases the available pump displacement capacity for the pump 26. While downshifting may decrease the fluid economy and/or increase the noise of the tractor 10 and the engine 18, the tractor 10 will at least be able to meet its hydraulic fluid needs during the temporary period. Thus, during conditions where extra hydraulic fluid flow is needed (e.g., at the end of the row in the field when the tractor 10 wishes to lift a planter or during other temporary conditions where extra hydraulic fluid pressure is needed for the tractor implement, attachment, and/or control 30, or a system of tractor implements, attachments, and/or controls 30), the transmission 22 in the hydraulic control system 14 will deviate from the standard SUTB condition.

By initiating the downshift prior to the swashplate 38 reaching its second fixed angle (e.g., at 85%, 90%, 95%, etc. of the second fixed angle), the transmission 22 has enough time to complete the downshift before the swashplate 38 has reached the second fixed angle and the pump 26 has reached its maximum displacement based on current engine speed. In some constructions the transmission 22 may complete the downshift simultaneous to the swashplate 38 reaching the second fixed angle. The angle of the swashplate 38 at which the downshift is triggered may be dependent upon the particular tractor 10 or other vehicle and the time duration required for downshifting for that particular vehicle.

In some constructions, and with continued reference to block 54 in FIG. 3, the controller 24 determines whether a single gear shift or multiple gear shifts are required to meet the hydraulic fluid needs of the pump 26. For example, if significant added hydraulic pressure is needed, the controller 24 may determine that multiple downshifts are needed, and will thus cause the transmission 22 to downshift more than once or skip gears. This innovation also works with transmission types of an infinitely variable nature wherein gear step size is very small. Changes of transmission ratio, engine speed and pump displacement may occur more frequently in smaller steps.

The benefits of this logic/code are an enhanced output of the hydraulic control system 14 and an increased capability to reduce losses through use of SUTB whenever possible. Additionally, pump sizing can be kept to a minimum. In some constructions, when the pump 26 demands engine speeds higher than peak power of the engine 18, the peak power value can be used to limit supplemental hydraulic flow. This is a hydraulic power versus absolute engine power compromise situation.

While the illustrated construction utilizes a swashplate piston hydraulic pump, in some constructions the hydraulic pump 26 is a fixed pump with a variable displacement motor on the tractor implement, attachment, or control 30. In yet other constructions the hydraulic pump 26 is a vane pump, or other type of variable-displacement pump. Additionally, while the illustrated construction uses a sensor 42 to detect an angle of a swashplate 38, in yet other constructions the sensor 42 may be a flow meter that detects displacement of the pump 26. So long as a displacement or flow can be measured at the pump 26 via the sensor 42, the controller 24 is then able to identify that the pump 26 is approaching its maximum displacement or flow, and can accordingly downshift the engine and/or increase engine speed.

For example, in constructions where the sensor 42 is a flow meter, the flow meter may be calibrated to the pump 26. The controller 24 may then gather information (e.g., from the sensor 42 and/or other sensors) on flow, pump input speed and any volumetric efficiency and temperature compensation relationships. The controller 24 may then solve the relationships provided below to determine pump displacement as compared to the pump's possible displacement range:

$$\text{PumpFlow} = \text{PumpSpeed} \times \text{PumpDisplacement} \times \text{VolumetricEfficiency}$$

$$\text{PumpDisplacement} = \text{PumpFlow}/(\text{PumpSpeed} \times \text{VolumetricEfficiency})$$

$$1 \times \text{RPM} \times (1 \times cm^3/\text{REV}) \times 92\% = 9.2 \times 10^{-4} \text{ (liter/min)}$$

In some constructions, volumetric efficiency may be a function of oil temperature. Calculated displacement may be compared to minimum and maximum displacement of the pump 26 and may be used as an equivalent to a swashplate angle measurement.

With continued reference to FIG. 3, and as illustrated in block 58, in some constructions once the angle of the swashplate 38 has decreased and fallen back below the predetermined percentage of the second fixed angle (or below the predetermined angle), the controller 24 receives a signal from the sensor 42 indicating the decreasing angle and causes the transmission 22 to shift back up. In some constructions, the controller 24 may determine whether a gear shift up will satisfy hydraulic pump flow needs. The controller 24 may utilize the following logic/code:

If (maximum hydraulic pump displacement−current hydraulic pump displacement−margin)/maximum hydraulic pump displacement>gear step size, then Revert to normal drive strategy SUTB control
Set state to pump flow control drive strategy=false In some constructions, and as noted above, the transmission 22 may be a manual transmission. Thus, in these constructions the sensor 42 provides a signal to the operator (e.g., to a display, or an audio signal) that the angle of the swashplate 38 is closely approaching the second fixed angle. The operator may then manually downshift the transmission 22 so as to increase engine speed. In these constructions the angle of the swashplate 38 at which the signal is provided may be different than that of the automatic transmission 22, so that the operator has enough time to manually downshift before the swashplate 38 reaches the second fixed angle. Additionally, the sensor 42 may provide a signal to the operator that the angle of the swashplate 38 has fallen below the predetermined percentage. The operator may then manually up-shift.

Various features and advantages of the disclosure are set forth in the following claims.

What is claimed is:

1. A tractor comprising:
    an engine;
    a transmission coupled to the engine;
    a hydraulic pump driven by the engine;
    at least one of a tractor implement, attachment, or control movable by the hydraulic pump;
    a sensor configured to detect an angle of a swashplate in the hydraulic pump; and
    a controller coupled to the transmission, wherein the controller is configured to downshift the transmission based on a first signal received from the sensor indicating the hydraulic pump is approaching a maximum pump displacement and is configured to upshift the transmission based on a second signal received from the sensor indicating the angle of the swashplate has fallen below a predetermined angle.

2. The tractor of claim 1, wherein the hydraulic pump includes a pump housing and wherein the swashplate is disposed within the pump housing.

3. The tractor of claim 1, wherein the transmission is an automatic transmission.

4. The tractor of claim 1, wherein the predetermined angle is a first predetermined angle, wherein the controller is configured to determine whether the swashplate has reached a second predetermined angle based on the first signal, and wherein the controller is configured to downshift the transmission if the swashplate has reached the second predetermined angle.

5. The tractor of claim 1, wherein the at least one of a tractor implement, attachment, or control is one of a planter on-board control, a front shovel, a rear shovel, or a mowing blade.

6. The tractor of claim 1, wherein the controller is configured to downshift the transmission more than once based on the first signal received from the sensor.

7. A swashplate pump assembly comprising:
    a swashplate pump having a pump housing and a swashplate disposed within the pump housing;
    a sensor disposed within the housing and configured to detect an angle of the swashplate; and
    a controller configured to downshift a transmission disposed within a tractor based on a first signal received from the sensor indicating the angle of the swashplate has reached a first predetermined angle and to upshift the transmission based on a second signal received from the sensor indicating the angle of the swashplate has fallen below a second predetermined angle.

8. The swashplate pump assembly of claim 7, wherein the swashplate pump is a hydraulic pump disposed within a tractor.

9. The swashplate pump assembly of claim 8, wherein the swashplate pump is coupled to at least one of a tractor implement, attachment, or control, and wherein the swashplate pump is configured to supply hydraulic fluid to cause movement of the tractor implement, attachment, or control.

10. The swashplate pump assembly of claim 7, wherein the transmission is an automatic transmission.

11. A control system for adjusting a transmission on a tractor, the control system comprising:
    a memory; and
    a processor, wherein the processor is configured to receive a first signal from a sensor and to determine whether a hydraulic pump is approaching a maximum pump displacement based on the first signal, wherein the processor is further configured to send a second signal to a transmission to cause the transmission to downshift if the processor determines that the hydraulic pump is approaching the maximum pump displacement, and wherein the processor is configured to send a third signal to the transmission if the processor determines that an angle of a swashplate has fallen below a predetermined angle, the third signal configured to cause the transmission to upshift.

12. The control system of claim 11, wherein the sensor is configured to determine the angle of the swashplate within the hydraulic pump.

13. The control system of claim 12, wherein the processor is configured to send the second signal if the processor determines that the angle of the swashplate has increased to another predetermined angle.

14. A tractor having the control system of claim 11, wherein the tractor includes an engine coupled to the transmission and at least one of a tractor implement, attachment, or control coupled to the hydraulic pump.

* * * * *